United States Patent

[11] 3,590,660

| [72] | Inventor | Warren G. Bopp<br>Farmington, Mich. |
|---|---|---|
| [21] | Appl. No. | 851,015 |
| [22] | Filed | Aug. 18, 1969 |
| [45] | Patented | July 6, 1971 |
| [73] | Assignee | Eaton Yale & Towne<br>Cleveland, Ohio |

[54] SHIFT BLOCKER
28 Claims, 7 Drawing Figs.

[52] U.S. Cl. .................................................. 74/781 R,
192/53 F
[51] Int. Cl. .................................................. F16d 23/06
[50] Field of Search ............................................ 192/53;
74/695, 781

[56] References Cited
UNITED STATES PATENTS

| 1,859,528 | 5/1932 | Potts | 192/53 X |
| 2,101,827 | 12/1937 | Thompson | 192/53 X |
| 2,359,982 | 10/1944 | Flinn | 192/53 |
| 2,919,774 | 1/1960 | Russell | 192/53 |
| 3,503,280 | 3/1970 | Bopp | 74/695 |

Primary Examiner—Carlton R. Croyle
Assistant Examiner—Thomas C. Perry
Attorneys—Teagno & Toddy ABSTRACT: A transmission shift blocker for a coupling member adapted to connect a pair of power elements of the type having a pair of blocker elements which prevent shifting of the coupling member except when in a particular position relative each other, with this positioning determined by the difference in angular speed of the power elements to be connected and arranged to allow shifting at low relative angular speeds but not at higher relative angular speeds, featuring damping of the relative movement of the blocker elements in order to improve reliability and also having a camming action between them to increase the damping force under dynamic conditions and to accurately control their response to the relative angular speeds of the connected power elements, so that the relative angular speeds at which the blocker becomes effective may be more precisely controlled.

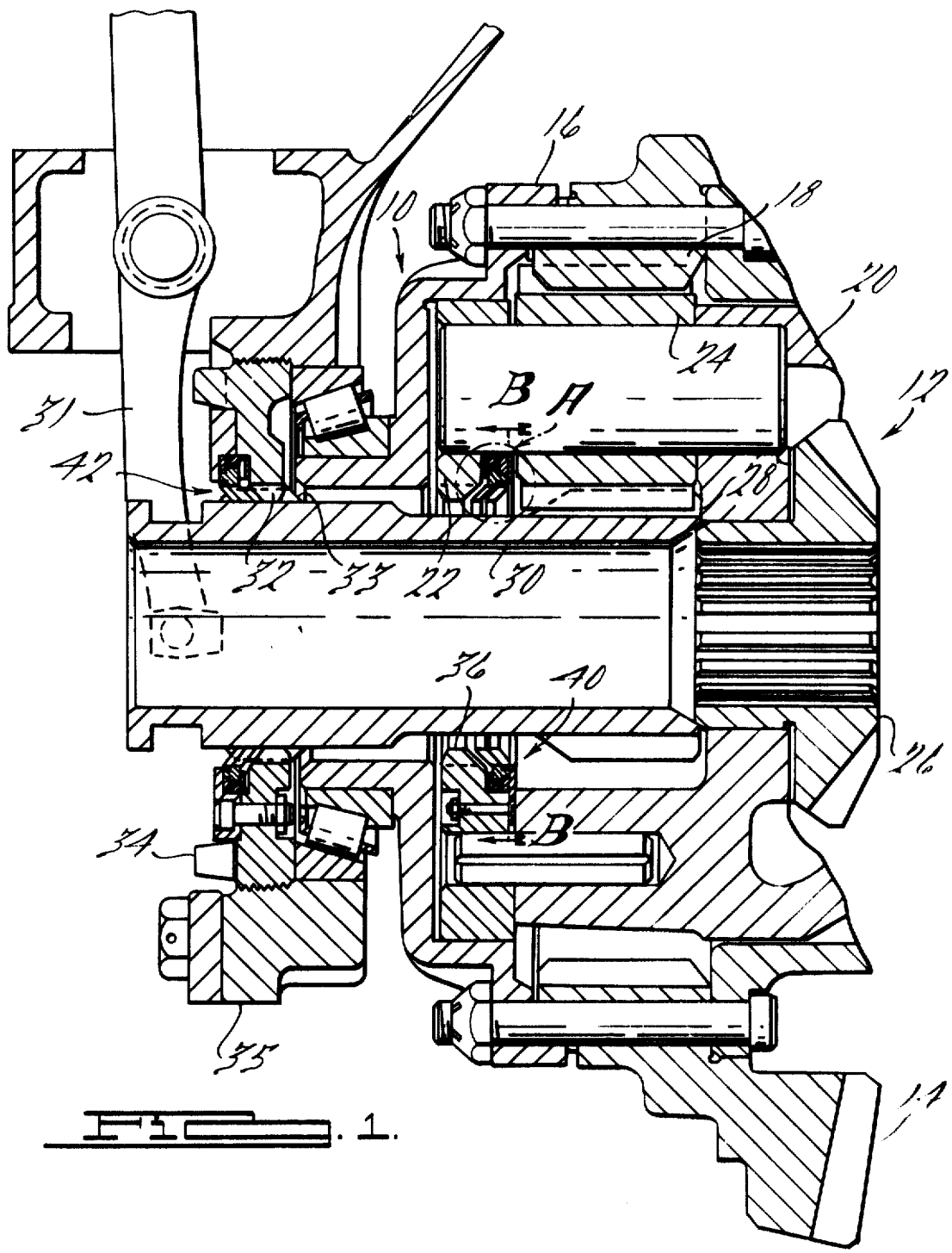

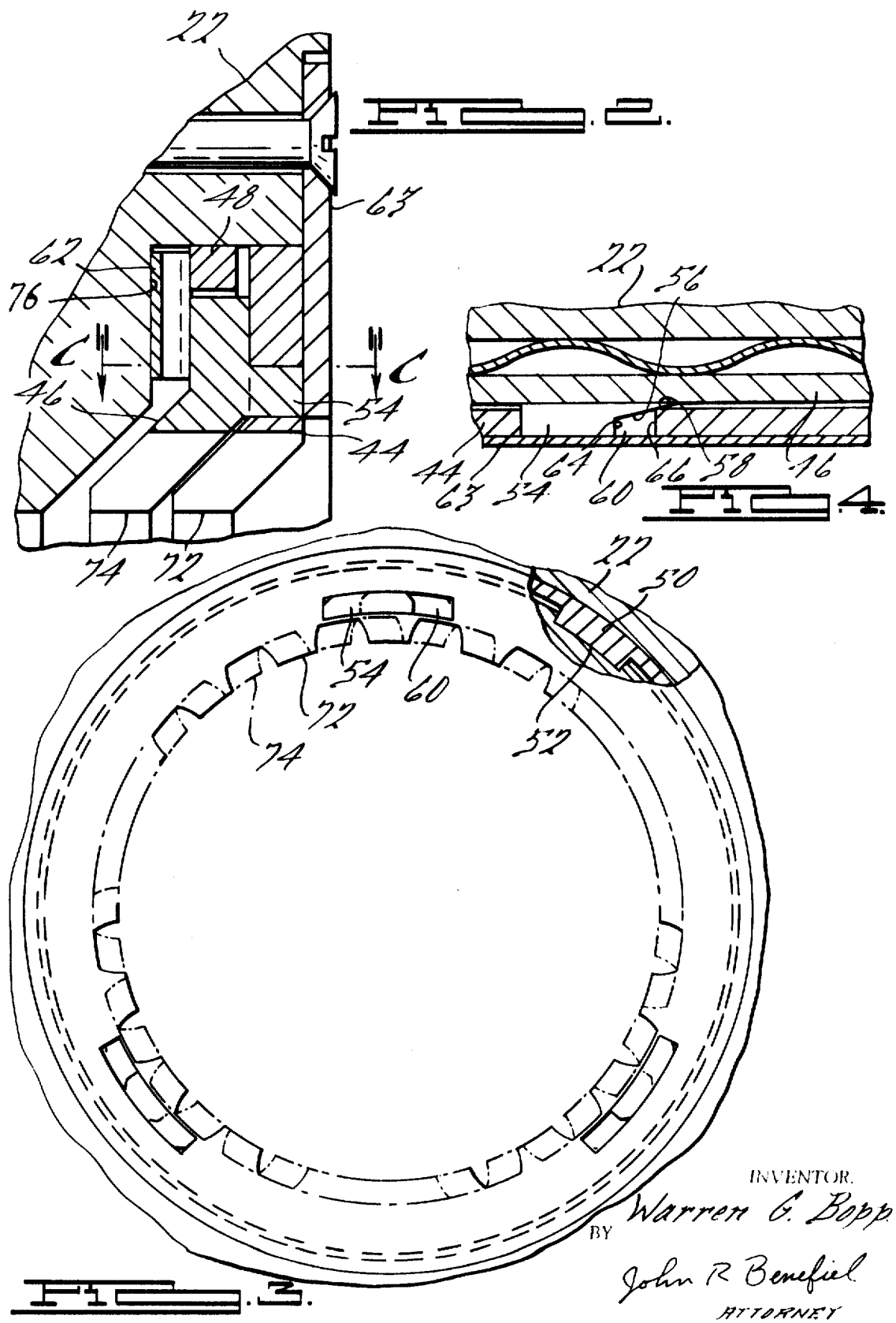

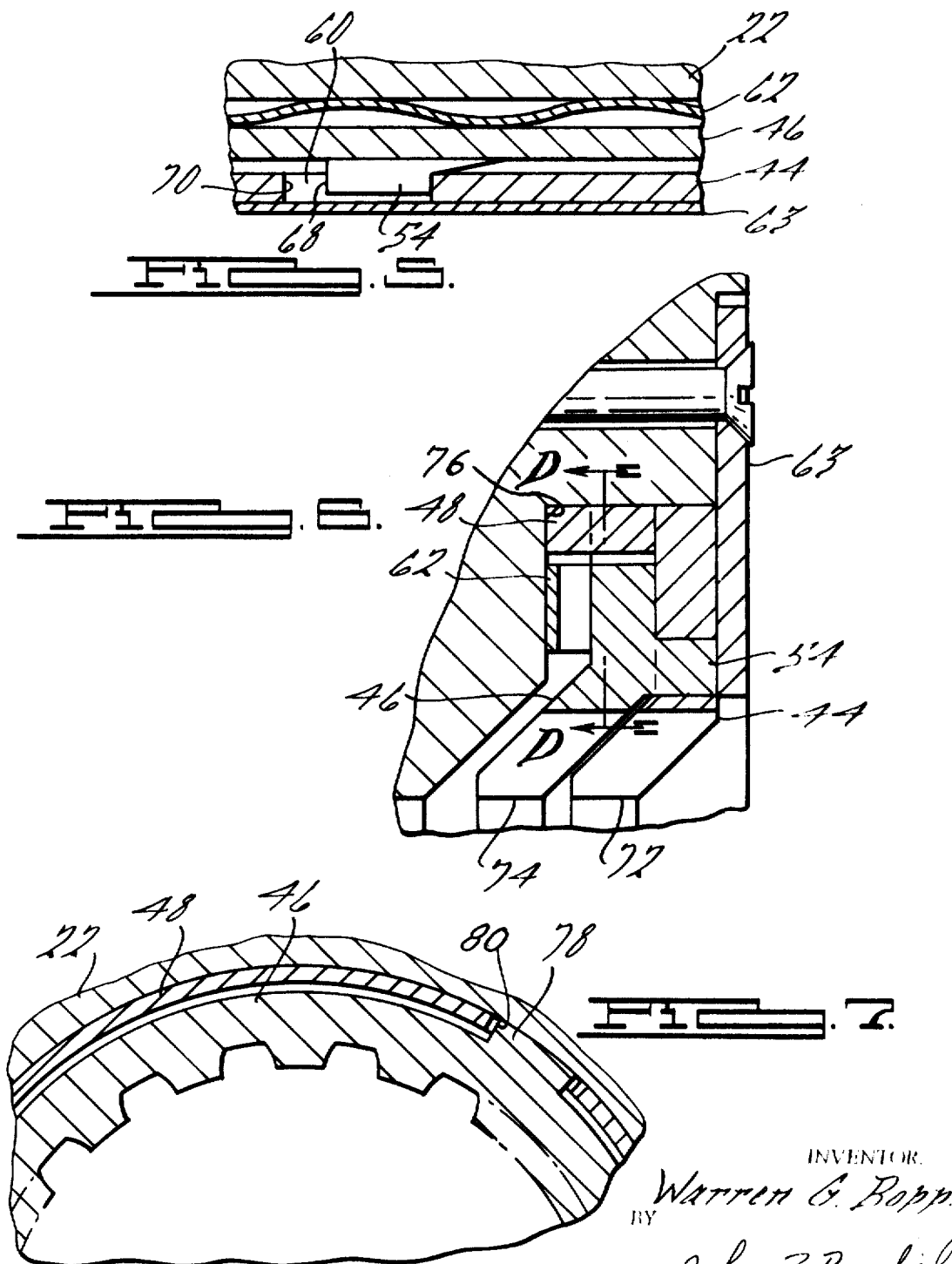

SHIFT BLOCKER

BACKGROUND OF THE INVENTION

This invention is related to transmission shift blocker devices which act to prevent connecting of power elements under certain conditions of the power elements to be connected and more particularly to a shift blocker which allows shifting movement of a coupling member at low, nonsynchronous speeds, but not at high relative angular speeds, and is an improvement over the blocker device disclosed in copending U.S. application Ser. No. 691,905, now U.S. Pat. No. 3,503,280 assigned to the same assignee as the present application. The blocker device disclosed in that application utilizes a pair of blocker elements which in a first position allow shifting movement of a coupling member and prevent it in a second relative position, with the position of these elements being controlled by the relative angular velocity of the power elements to be connected. While this arrangement is generally satisfactory, it has developed that under certain circumstances "missed" blocks would occur, i.e., the blocker did not function, which, it was found, were due in part to the blocker elements bouncing when contacting each other at high relative speeds at the end of their travel to the blocked position. In addition, it was felt to be desirable to be able to more accurately predict the restoring force created when the blocker elements moved toward the blocked position so that the point at which the blocker becomes effective may be more carefully controlled.

Therefore it is an object of the present invention to provide a two-element shift blocker which eliminates bounce of these elements during a shift cycle and hence to provide improved blocker reliability.

It is a further object to provide a two-element blocker in which the relative angular speed at which the blocker begins to function may be precisely controlled.

SUMMARY

These and other objects which will become apparent from a reading of the following detailed description and the appended claims are accomplished by introducing a damping force into the system by biasing the elements into frictional engagement. This biasing force increases under dynamic conditions through the use of a cam arrangement between the blocker elements, which also serves the purpose of more carefully controlling the resultant relative movement of the blocker elements under the influence of the opening and closing forces.

BRIEF DESCRIPTION OF THE DRAWINGS

FIG. 1 is a partially sectional view of a two-speed planetary gear transmission incorporating a blocker according to the present invention.

FIG. 2 is a detail of the area A in FIG. 1.

FIG. 3 is a view of the section taken along the line B-B in FIG. 1.

FIG. 4 is a view of the section taken along C-C in FIG. 2.

FIG. 5 is a view of the section taken along line C-C when the blocker elements are in the closed position.

FIG. 6 is a partially sectional view of an alternate embodiment of the invention.

FIG. 7 is a view of the section taken along the line D-D in FIG. 6.

DETAILED DESCRIPTION

Before referring to the drawings, it is noted that for the sake of clarity and a more complete understanding of the invention, specific terminology will be used and specific embodiments will be described, but it should be understood that the practice of the invention is not so limited.

Depicted in FIG. 1 is a two-speed planetary transmission 10, which is indicated in combination with a standard differential unit 12, partially shown. This is a series connection, in which the propeller shaft output (not shown) drives the large bevel gear 14, which is in turn connected to the input ring gear 18. The output of planetary transmission 10 is the planet pinion carrier 20, which rotatably supports the planet pinions 24. This output carrier 20 is connected to the differential carrier (not shown) in order to drive the differential output axle shafts (not shown) which would be splined to the side gears 26.

A sun gear 28 is alternately clutched to the carrier 20 and braked via the integral coupling sleeve 30 in order to provide the dual ratio drive. In the position shown, the sun gear 28 is braked via a splined connection 32, 33 to a fixed plate 34 rotatably secured to a stationary housing 35 in order to provide a low ratio drive, and by sliding movement of coupling sleeve 30 accomplished by means of operating lever 31, the sun gear 28 is effectively disconnected from the housing 35 and subsequently clutched to the carrier 20 by a spline connection 36 with high clutch plate 22 which is secured to the carrier 20, in order to provide a direct drive.

In making shifts between these ratios, it will be appreciated that angular velocity differences will exist between these elements connected via the coupling member 30. The sun gear 28 will be stationary at the time it is fixed to the fixed plate 34 and the clutch plate 22 affixed to the carrier 20 to which it will be clutched will be revolving at a considerable angular velocity, while similarly the sun 28 will revolve at the same angular velocity as the input ring 18 immediately before it is to be declutched and connected to the fixed plate 34. This difference in angular velocity would lead to rather rapid spline tooth wear due to ratcheting if shifts were carried through under these conditions. For this reason, blocker assemblies 40 and 42 are provided in a manner similar to that disclosed in the above-identified application which function to block movement of coupling sleeve 30 to engage with either fixed plate 34 or the clutch plate 22 whenever angular velocity differences between the coupled elements exceed a predetermined value, in a manner to be hereinafter disclosed.

The blocker assemblies 40 and 42 are similar to each other except the assembly 42 is installed in a reverse position from that of assembly 40, so that only blocker assembly 40 will be described in detail.

Referring to FIG. 2, this assembly is comprised of a pair of internally toothed blocker rings 44 and 46 disposed within a cavity 76 in the clutch plate 22. Surrounding the blocker ring 46 is a split coupling drag spring 48, which is drivingly connected thereto via a mating protrusion 50 and cavity 52 (FIG. 3), which functions to create a drag force whenever relative movement in either direction occurs between the blocker ring 46 and the clutch plate 22, since the coupling spring 48 tends to expand into tighter frictional engagement with the clutch plate 22 under these conditions.

Drivingly connecting the blocker rings 44 and 46 are sets of cooperating cam surfaces 56 and 58 formed on protrusion 54 and opening 60 formed on these respective blocker rings. These cam surfaces cooperate to convert rotative relative movement of the blocker rings 44 and 46 to axial relative movement. This axial movement is resisted by a wave spring 62, which cooperates with a retainer 63 serving to prevent axial movement of the blocker ring 44 in response to the action of the wave spring 62.

The protrusions 54 and openings 60 are provided with mating abutment surfaces 64, 66, 68 and 70 (FIG. 5) so as to position the blocker rings 44 and 46 at the extremes of their rotative travel relative to each other. These surfaces are located with respect to the internal teeth 72 and 74 so that when surfaces 68 and 70 abut, (spring 62 fully extended) the teeth 72 of blocker ring 44 and the teeth 74 of blocker ring 46 are aligned to allow the teeth of the sun gear 28 on coupling member 30 to pass through, and when the surfaces 64 and 66 abut the teeth are offset as indicated in FIG. 3, so as to block passage of the coupling member 30.

OPERATION

Assuming the planetary transmission 10 to be in low, i.e., the sun 28 connected to the fixed plate 34 via splines 32 as shown in FIG. 1, the ring gear 18 is being driven by the propeller shaft, which in turn drives the carrier 20 at a reduced speed. In order to shift into high range, the coupling sleeve 30 is manipulated to move to the left, after unloading the teeth by allowing the vehicle to coast, which first disconnects the sun 38 from the housing 34 and puts the transmission into neutral. Upon continued travel of the coupling sleeve 30, the teeth of the sun 28 encounter the first blocker ring 44, passing into and engaging the internal teeth 72. Since an angular velocity difference exists between the sun 28 and the clutch plate 22, relative movement is induced between the blocker rings 44 and 46. This is caused by the action of the drag spring 48, and the inertia of blocker ring 46, which tends to drive the blocker ring 46 against the resistance of the stationary or slow moving sun 28 which is felt through the contact of surfaces 56 and 58. It should be emphasized that the drag spring 48 does not form a positive connection with the clutch plate 22, but creates a driving force while slipping with respect to the clutch plate 22, this force increasing with angular velocity differences between the elements to be connected since inertia of the spring 48 tends to cause radial expansion. This force tends to produce relative movement between the blocker rings to the position shown in FIG. 5 due to the resistance of the sun 28, and the teeth of sun 28 then abut against ring 46. This relative movement is resisted by the wave spring 62, since relative rotation of the blocker rings 44 and 46 is reflected in relative axial movement, in turn tending to compress the wave spring 62. Hence, the restoring force is a function of the ramp angle and the spring force.

The relative movement of the blocker rings is further inhibited by the frictional damping force created by the sliding contact of surfaces 56 and 58. This force will be examined in more detail infra.

The coupling sleeve 30 is thus prevented from moving to engage teeth 36 by the misaligned teeth 72 and 74 on the blocker rings 44 and 46 respectively, if the force created by the drag spring 48 and the inertia of the ring 46 exceeds that created by the wave spring and frictional resistance. By allowing the propeller shaft to be driven by the road wheels, the carrier 20 tends to drive the sun 28 using the ring 18 as a reaction, and the sun 28 will approach the speed of the carrier 20, pass through synchronous speed and then start to slowly overspeed with respect to the carrier 20. At this point, the force exerted by drag spring 48 will reverse and retard the movement of the inner ring 46 relative to the clutch plate 22, which in turn causes relative rotation of the blocker rings to the position shown in FIG. 4, allowing the coupling sleeve 30 to pass through. Continued driving of the sun 28 by the carrier 20 in the manner above described will tend to overdrive the sun 28 with respect to the carrier 20, and when the teeth 36 align with those of the sun 28, the coupling sleeve 30 will move into engagement therewith, and the transmission will be locked up, producing a direct drive.

The operation in shifting from direct to low is similar, except that in order to reduce the speed of the sun 28, the input ring 18 must be the driver, using the carrier 20 as a reaction, which may be accomplished by manipulating the vehicle accelerator. This causes the sun 28 to be driven until it approaches rest, allowing the blocker rings to align and the coupling sleeve 30 to pass through. Continued driving of the sun 28 will cause it to rotate in a reverse direction with the result that slow rotation will occur, allowing the teeth of the spline connection 32, 33 to align and the sun 28 to be connected to the fixed plate 34.

It can be seen that the blocker assemblies 40 and 42 will act to prevent shifts when substantial differences in angular velocities exist between the elements to be connected, but will not be effective under conditions of rest or low angular velocity differences. Furthermore, the point at which the blocker assemblies 42 and 44 begin to function may be accurately controlled, since the opening force is not purely a spring force, but is a function of the spring force, inertia of the ring 46, the ramp angle and the coefficient of friction, and hence may be calibrated to more consistently close at a desired angular velocity difference.

In order to better understand the present invention, the role of the damping frictional force will be examined. In the absence of damping, it has been found that considerable momentum differences between the inner and outer blocker rings 46, 44 builds up as the inner blocker ring 46 is driven by the drag spring 48, and upon impacting the abutments, a transfer of momentum occurs, producing rather high impulse forces, occasionally causing a rebound effect, which in turn may cause the blocker ring teeth to become prematurely aligned, and resulting in a missed block if the coupling sleeve 30 happens to be in the proper position when the teeth become aligned. This condition is alleviated according to the present invention by introducing frictional damping into the system in order to lessen the relative speed with which the rings move to the closed position, and hence lessen the momentum transfer and impulse force at the moment of extreme relative travel of the rings 44, 46 when abutments contact each other. This is by the frictional engagement of the blocker rings 44 and 46 under the influence of the wave spring 62, thereby introducing coulomb damping into the system tending to inhibit relative movement between the rings 44, 46, which will act to lessen the momentum transfer and impulse force at the moment of extreme relative travel by contact at the abutments or otherwise, and hence the rebound incidence, by causing the outer ring 44 to controllably drive the inner ring 46 against the drag force of the spring 48 as they move to the closed position.

A closer examination will reveal that the particular arrangement shown introduces increasing damping forces as the drag force created by drag spring 48 increases, and as the initial difference in angular velocity between the connected elements increases. This is so because the force component exerted normally to the ramp 56 by the surface 58 increases as the reaction available to resist the force exerted by the wave spring 62 increases and the reaction available is increased by the countering drag coupling force, hence providing an additional frictional force under these conditions. This allows the wave spring 62 to act to open the blocker rings 44 and 46 under zero or low-speed conditions, with relatively little frictional resistance, while providing adequate frictional damping to eliminate rebound under high-speed conditions, acting to resist high transient drag spring forces exerted as a result of the inertia of the spring at the beginning of movement to the closed relative position of the rings.

An alternate embodiment is shown in FIGS. 6 and 7. This blocker assembly is similar to that described above with two important differences in the disposition of the coupling drag spring 48 and the wave spring 62. In this embodiment the coupling spring 48 extends outside the wave spring 62 and bottoms out in the cavity 76. The bottom of the cavity 76 coacts with the adjacent annular axial edge of spring 48 to provide a backup for outer ring 44 to prevent blocker ring 46 from absorbing axial loads induced by the impact of the teeth of sun gear 28 with the teeth 72 of the outer ring 44. This loading can cause the two rings 44 and 46 to be frictionally clutched together and prevent the blocker rings from rotating relative to each other to the closed position, hence causing a "missed" block.

In addition, as shown in FIG. 7, the driving connection between the blocker ring 46 and the coupling spring 48 is a tongue 78 extending into the split portion 80 of the coupling spring 48. This allows both a simpler and cheaper spring construction and in addition provides full spring energization upon movement in either direction, in turn providing a maximum drag force in either direction.

It is also noted that inner blocker ring 46 is made thinner than the outer ring 44 in this embodiment, in order to reduce the time required to complete the shift, once the blocker opens, which aids in providing a more rapid shift.

From the above-detailed description it will be appreciated that a highly reliable and effective blocker mechanism has been provided. However, it should be understood that the invention may be practiced in a variety of forms other than in the form of these specific embodiments.

I claim:

1. A blocker for a movable coupling member adapted to selectively connect two relatively rotatable spaced elements comprising:
   a first and a second blocker element;
   means allowing said coupling member to move to connect said spaced elements in a first position of said blocker elements relative to each other and preventing said coupling member from moving to connect said spaced elements in a second position of said blocker elements relative to each other;
   first means providing a force tending to produce relative movement of said blocker elements towards said second relative position whenever said coupling member is attempted to be moved to connect said spaced elements if an angular velocity difference exists between said spaced elements:
   second means providing a force urging said blocker elements to said first relative position independent of the position of said coupling member;
   damper means inhibiting relative movement of said blocker elements, including means biasing portions of said blocker elements into frictional engagement, whereby relative movement of said first and second blocker elements to said second position occurs whenever said first means overcomes said second and damper means.

2. The blocker of claim 1 wherein said damper means also includes means for providing a damping force against said relative movement in response to said angular velocity difference whereby said damping forces are increased when said angular velocity difference exists.

3. The blocker of claim 2 further including limiting means preventing further relative movement of said blocker elements beyond said first or second relative position.

4. The blocker of claim 3 wherein said means providing a damping force in response to said relative angular velocity difference includes means increasing said bias of said blocker element portions into mutual engagement during movement to said second position when said angular velocity difference exists.

5. The blocker of claim 4 wherein said means increasing said bias includes camming means between said blocker elements responsive to relative movement therebetween to increase said bias.

6. The blocker of claim 1 wherein said first means includes a drag coupling comprising:
   a resilient member drivingly connected to and surrounding one of said blocker elements and surrounded by and in frictional engagement with one of said spaced elements, whereby, when said coupling member is attempted to be moved to connect said spaced elements, said force tending to produce relative rotation of said blocker elements increases with increasing differences in angular velocity of said spaced elements, and said tending force overcomes said force produced by said second and said damper means at a predetermined difference in angular velocity.

7. The blocker of claim 1 wherein said first means includes:
   means drivingly connecting said coupling member and one of said spaced elements;
   means slideably connecting said first blocker element and said coupling member upon movement of said coupling member to connect said spaced elements;
   a drag coupling providing a force for drivingly connecting said second blocker element with another of said spaced elements, said drag coupling having means for varying said driving force in response to varying velocity differences between said second blocker element and said spaced element.

8. The blocker of claim 7 wherein said varying means comprises means for increasing said driving force with increases in said angular velocity difference, whereby said coupling member is prevented from moving to connect said spaced elements when said velocity difference is a predetermined amount.

9. The blocker of claim 8 wherein said second means includes means resiliently resisting said force produced by said first means.

10. The blocker of claim 8 wherein said damper means includes means increasing said bias in response to said force generated by said first means.

11. The blocker of claim 10 wherein said means increasing said bias includes cooperating cam surfaces on said blocker elements tending to exert an axial force on one of said blocker elements in response to said force produced by said first means.

12. The blocker of claim 11 wherein said cam surfaces slide on each other and are disposed so as to increase the contact pressure in response to said force produced by said first means.

13. The blocker of claim 11 wherein said second means includes resilient means resisting said force produced by said first means, said resilient means including means producing an axially directed force on one blocker element in response to said force provided by said first means and further including a resilient member disposed to resist axial movement of said one blocker element.

14. The blocker of claim 13 wherein said means producing said axial force includes at least one ramp on one of said blocker elements and at least one cooperating surface on the other of said blocker elements disposed in engagement therewith.

15. The blocker of claim 1 further including backup means to prevent said coupling member from increasing said bias as it contacts said blocker element when moving to connect said spaced elements, whereby frictional clutching of said blocker elements by said member is eliminated.

16. A coupling arrangement to selectively connect a first and second member comprising:
   a coupling member;
   means drivingly connecting said coupling member and said first member;
   means connecting said coupling member to said second member after continued travel of said coupling member in a given direction;
   first and second blocker elements;
   blocker means allowing said coupling member to move to connect with said second member in a first relative position of said blocker elements, and preventing said coupling member to move to connect with said second member in a second relative position of said blocker elements;
   first means providing a force tending to produce relative movement of said blocker elements to said first relative position when they are displaced toward said second relative position, including means producing a biasing force on said blocker elements directed along the direction of travel of said coupling member in response to relative displacement of said blocker elements towards said second position and further including means responsive to said biasing force to produce said force tending to position said blocker elements in said first relative position;
   second means providing a force tending to produce relative movement of said blocker elements to said second relative position whenever said coupling member is attempted to be moved to be connected with said second member if an angular velocity difference between said first and second member exists, whereby said coupling member is prevented from moving to connect with said second member when said force produced by said second means is sufficient to move said blocker elements to said second relative position.

17. The arrangement of claim 16 wherein said means responsive to said biasing force includes cam surfaces on said blocker elements engaged with each other tending to produce relative rotation of said blocker elements to said first position, in response to said bias force.

18. The blocker of claim 17 wherein said means producing said biasing force includes a resilient member and means frictionally connecting said resilient member and one of said blocker elements, whereby said bias force tends to move said blocker elements axially toward each other.

19. The blocker of claim 17 wherein said cam surfaces includes at least one ramp portion fixed to one of said blocker elements, whereby the force produced by said first means is a function of said ramp angle and said bias force.

20. The blocker of claim 17 further including backup means for said first blocker element preventing any force exerted by said coupling member upon coming into engagement with said first blocker element from being transmitted to said second blocker element.

21. The blocker of claim 17 wherein said second means further includes a drag coupling interposed between one of said second blocker member and said second element, whereby a rotative force tending to produce relative movement between said blocker elements is produced when said angular velocity difference exists.

22. The blocker of claim 21 wherein said drag coupling comprises a coupling spring surrounding said second blocker element and surrounded by a portion of said second member, and wherein said second means also includes a portion of said second blocker element drivingly connected to a portion of said coupling spring, whereby movement of said second member relative to said second blocker element is inhibited in either rotative direction.

23. The coupling arrangement of claim 21 wherein said second means further includes a drag coupling spring disposed surrounding said second blocker element and surrounded by a portion of said second member having a portion drivingly connected thereto, and wherein said backup means includes means mounting said coupling spring so that it prevents axial forces exerted by said coupling member on said first blocker element from being transmitted to said second blocker element, whereby frictional coupling of said blocker elements by impact of said coupling member is prevented.

24. The coupling arrangement of claim 16 wherein said force produced by said second means increases with increasing difference in said angular velocity and is effective to move said blocker elements to said second relative position at a predetermined velocity difference between said first and second member, whereby said coupling member may move to connect said first and second members at angular velocity differences below said predetermined difference.

25. In a change speed planetary gear transmission including driving elements and a stationary element, and adapted to have individual elements connected together or connected to the stationary element by movement of a slideable coupling member to obtain differing ratios, the improvement comprising:
   a first and a second blocker element interposed between at least one of said coupling members and the element to be connected by said movement;
   blocker means allowing said coupling member to move to connect said elements in a first position of said blocker elements relative to each other and preventing said coupling member from moving to connect said elements in a second position of said blocker elements relative to each other;
   first means providing a force tending to produce relative movement of said blocker elements to said first relative position when they are displaced toward said second relative position and including means producing a biasing force on said blocker elements in response to relative displacement of said blocker elements towards said second position directed along the direction of travel of said coupling member and further includes cam means responsive to said biasing force to produce said force tending to produce relative movement of said blocker elements towards said second position;
   second means providing a force tending to produce relative movement of said blocker elements to said second relative position whenever said coupling member is attempted to be moved to connect a pair of said elements of said planetary transmission whenever an angular velocity difference therebetween exists, whereby such movement is prevented whenever said force produced by said second means overcomes that produced by said first means and frictional resistance.

26. A blocker arrangement for a moveable member comprising:
   a first and second blocker element interposed in the path of travel of said moveable member;
   means allowing said moveable member to pass said blocker elements in a first position of said blocker elements relative to each other and preventing said moveable member from passing said blocker elements in a second position of said blocker elements relative each other;
   first means providing a force tending to produce relative movement of said blocker elements towards said second relative position when a predetermined condition exists;
   second means providing a force tending to produce relative movement of said blocker elements to said first relative position independent of the position of said moveable member;
   limit means positively preventing relative travel of said blocker elements beyond said second position;
   damper means producing a damping force inhibiting relative movement of said blocker elements sufficient to prevent rebound of said elements when acted on by said limit means.

27. The blocker of claim 26 wherein said damping force is increased whenever said predetermined condition exists.

28. A blocker arrangement for a shifter member having external teeth thereon and adapted to engage an internally toothed member in order to complete the shift comprising:
   a first annular blocker ring having internal teeth shaped to allow a mating connection with said shifter member external teeth;
   a second annular blocker ring having internal teeth thereon shaped to allow a mating connection with said shifter member;
   means positioning said blocker rings juxtaposed and concentric to each other and with said internally toothed member, including an annular cavity in said member receiving said blocker rings and having a contiguous radially extending shoulder;
   a coupling spring surrounding said second blocker ring and engaging with its outer periphery said cavity walls, and positioned against said shoulder, and having a driving connection with said second blocker ring tending to expand said coupling spring into firmer engagement with said cavity wall upon relative movement therebetween;
   a resilient member disposed radially inwardly of said coupling member in said cavity engaging said shoulder and said second blocker ring, exerting an axially directed resilient resistance to relative axial movement of said second blocker ring;
   a plurality of circumferentially spaced openings in one of said blocker rings;
   a plurality of tabs on the other of said blocker rings extending into said openings and having circumferentially extending ramp portions thereon;
   retainer means engaging said first blocker ring and preventing axial movement of said first blocker ring away from said second blocker ring in response to camming action of said tab ramps and said openings.